United States Patent
Sallovitz

(10) Patent No.: US 7,547,852 B2
(45) Date of Patent: Jun. 16, 2009

(54) HYDRAULIC SCALE FOR DETERMINING SEEDING DENSITY OF A PLANTER AND METHOD

(76) Inventor: Maximo Sallovitz, Santa Fe 1758 2nd Floor, 2000 Rosario, Santa Fe (AR)

( * ) Notice: Subject to any disclaimer, the term of this patent is extended or adjusted under 35 U.S.C. 154(b) by 49 days.

(21) Appl. No.: 11/888,046

(22) Filed: Jul. 31, 2007

(65) Prior Publication Data

US 2009/0031788 A1 Feb. 5, 2009

(51) Int. Cl.
| G01F 25/00 | (2006.01) |
| G01F 1/00 | (2006.01) |
| G01F 9/00 | (2006.01) |
| A01C 7/00 | (2006.01) |
| G01G 5/02 | (2006.01) |

(52) U.S. Cl. .............. 177/50; 73/1.36; 73/437; 73/861; 73/865.9; 111/200; 111/903; 221/2; 222/154; 222/158; 177/207

(58) Field of Classification Search ................. 177/207, 177/50; 73/437, 1.36, 861, 865.9; 221/2, 221/8; 111/200, 903; 222/1, 154, 158, 77
See application file for complete search history.

(56) References Cited

U.S. PATENT DOCUMENTS

| 70,546 A | 11/1867 | Goodes |
| 112,043 A | 2/1871 | Hudson |
| 171,670 A | 1/1876 | King |
| 232,245 A | 9/1880 | Deschamps |
| 607,010 A | 7/1898 | Baumann |
| 1,199,687 A | 9/1916 | Gephardt |
| 2,487,664 A | 11/1949 | Morgan |
| 2,544,032 A | 3/1951 | Lange et al. |
| 2,545,923 A | 3/1951 | Jackson |
| 2,647,740 A | 8/1953 | Jackson |
| 3,129,844 A * | 4/1964 | Madison ..................... 222/1 |
| 3,928,751 A * | 12/1975 | Fathauer ..................... 377/6 |
| 4,196,618 A | 4/1980 | Patterson |
| 4,277,833 A * | 7/1981 | Steffen ..................... 702/128 |
| 4,372,405 A | 2/1983 | Stuart |
| 4,409,845 A * | 10/1983 | Stufflebam et al. ............ 73/861 |
| 4,491,023 A * | 1/1985 | Graef ......................... 73/861 |
| 4,570,491 A * | 2/1986 | Machnee ..................... 73/861 |
| 4,624,332 A * | 11/1986 | Mills ......................... 177/224 |
| 4,630,481 A | 12/1986 | Bergstrom et al. |
| 4,663,960 A * | 5/1987 | Makkink ..................... 73/1.36 |
| 4,876,891 A | 10/1989 | Felt et al. |
| 5,125,466 A | 6/1992 | Felt et al. |
| 6,443,007 B1 | 9/2002 | Schnyder et al. |
| 6,732,667 B1 * | 5/2004 | Wilson ....................... 111/200 |
| 7,357,087 B2 * | 4/2008 | Wilson ....................... 111/200 |
| 2007/0220948 A1 * | 9/2007 | Sutton et al. ................. 73/1.36 |

* cited by examiner

Primary Examiner—Randy W Gibson
(74) Attorney, Agent, or Firm—Carter, DeLuca, Farrell & Schmidt, LLP

(57) ABSTRACT

A hydraulic scale for planter calibration is disclosed. The hydraulic scale includes a tube having indicia disposed thereon. The tube has a substantially closed bottom and a substantially open top. The indicia disposed on the tube include at least one scale having a zero line. The tube is configured to float substantially upright when positioned in a liquid, such that the zero line is substantially aligned with the surface of the liquid. A non-zero line portion of the scale is configured to align with the surface of the liquid when at least one of seeds and feed are placed within the tube.

16 Claims, 3 Drawing Sheets

HYDRAULIC SCALE FOR DETERMINING SEEDING DENSITY OF A PLANTER AND METHOD

BACKGROUND

1. Field of the Disclosure

The present disclosure relates to an apparatus which measures seeds, fertilizers, insecticide and/or other granulated products. More particularly, the present disclosure relates to a hydraulic scale for determining the seeding density of a planter.

2. Background of the Art

Farmers and other fieldworkers typically purchase various amounts of seed to plant in a planting filed. Tractors and other types of planters are often used to distribute and/or plant seeds and/or feed in the field. It is often a difficult task to determines how much seed being planted in a particular area or field and/or to determine if a particular planter is sufficiently calibrated. Further, this problem is magnified because different planters place seeds at different rates.

SUMMARY

The present disclosure relates to a hydraulic scale for planter calibration. The hydraulic scale includes a tube having indicia disposed thereon. The tube has a substantially closed bottom and a substantially open top. The indicia disposed on the tube include at least one scale having a zero line. The tube is configured to float substantially upright when positioned in a liquid (e.g., water), such that the zero line is substantially aligned with the surface of the water. A non-zero line portion of the scale is configured to align with the surface of the water when at least one of seeds and feed are placed within the tube.

The present disclosure also relates to a method of determining the seeding density of a planter. The method includes the steps of providing a hydraulic scale, including a tube having indicia thereon. The tube is configured to float substantially upright when positioned in a liquid, such that a zero line disposed on the tube is substantially aligned with the surface of the liquid. A non-zero line portion of the scale is configured to align with the surface of the liquid when at least one of seeds and feed are placed within the tube. The method also includes the steps of collecting seeds placed by a planter as the planter travels a distance, placing the seed within the hydraulic scale, placing the hydraulic scale within a liquid, and observing where the surface of the liquid intersects the scale.

BRIEF DESCRIPTION OF THE DRAWINGS

Embodiments of the present disclosure are described hereinbelow with reference to the drawings wherein.

DETAILED DESCRIPTION

Figure 1:
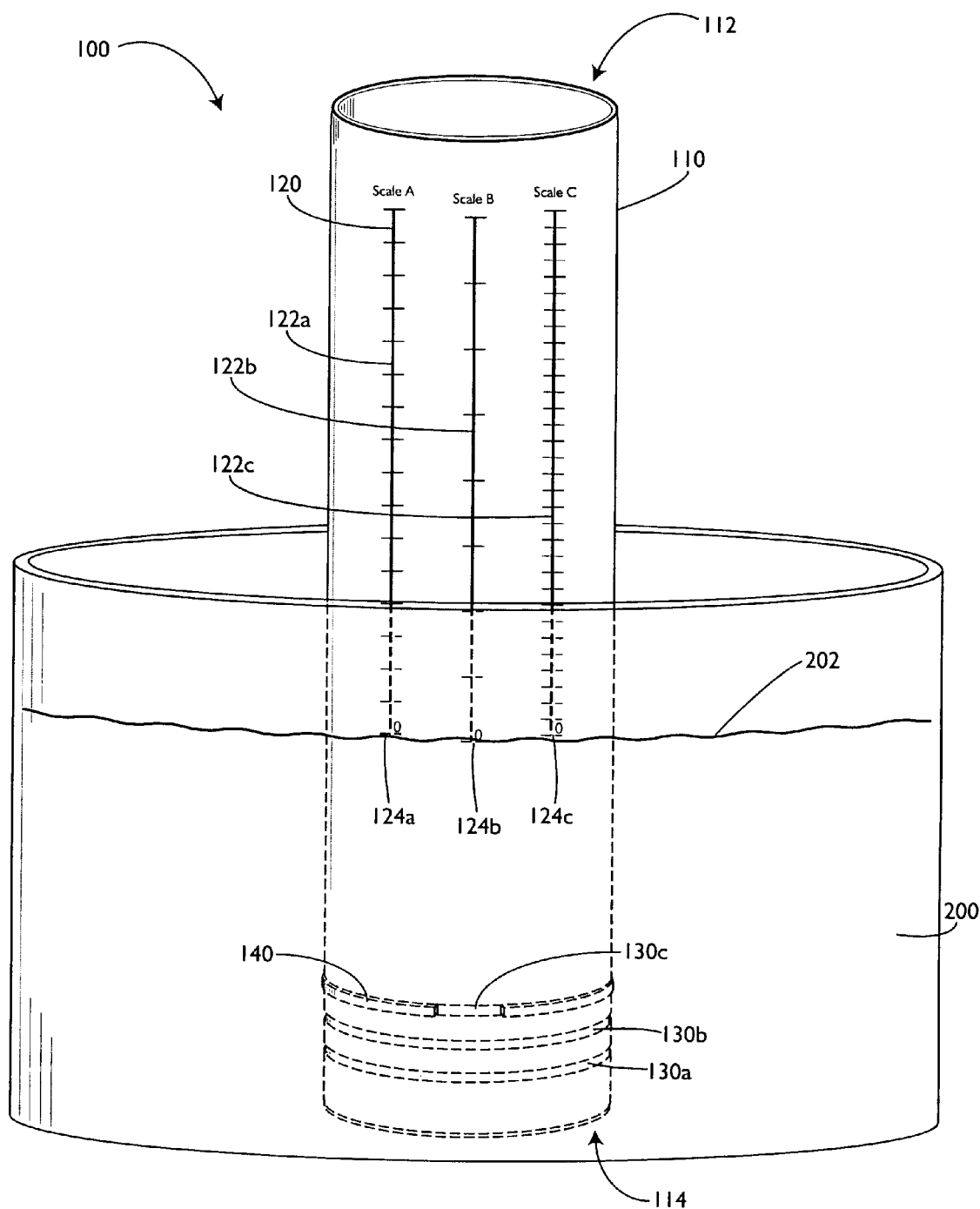
FIG. 1 is a perspective view of an empty hydraulic scale floating in a liquid in accordance with an embodiment of the present disclosure.

Embodiments of the presently disclosed hydraulic scale are now described in detail with reference to the drawings, in which like reference numerals designate identical or corresponding elements in each of the several views.

Figure 2:
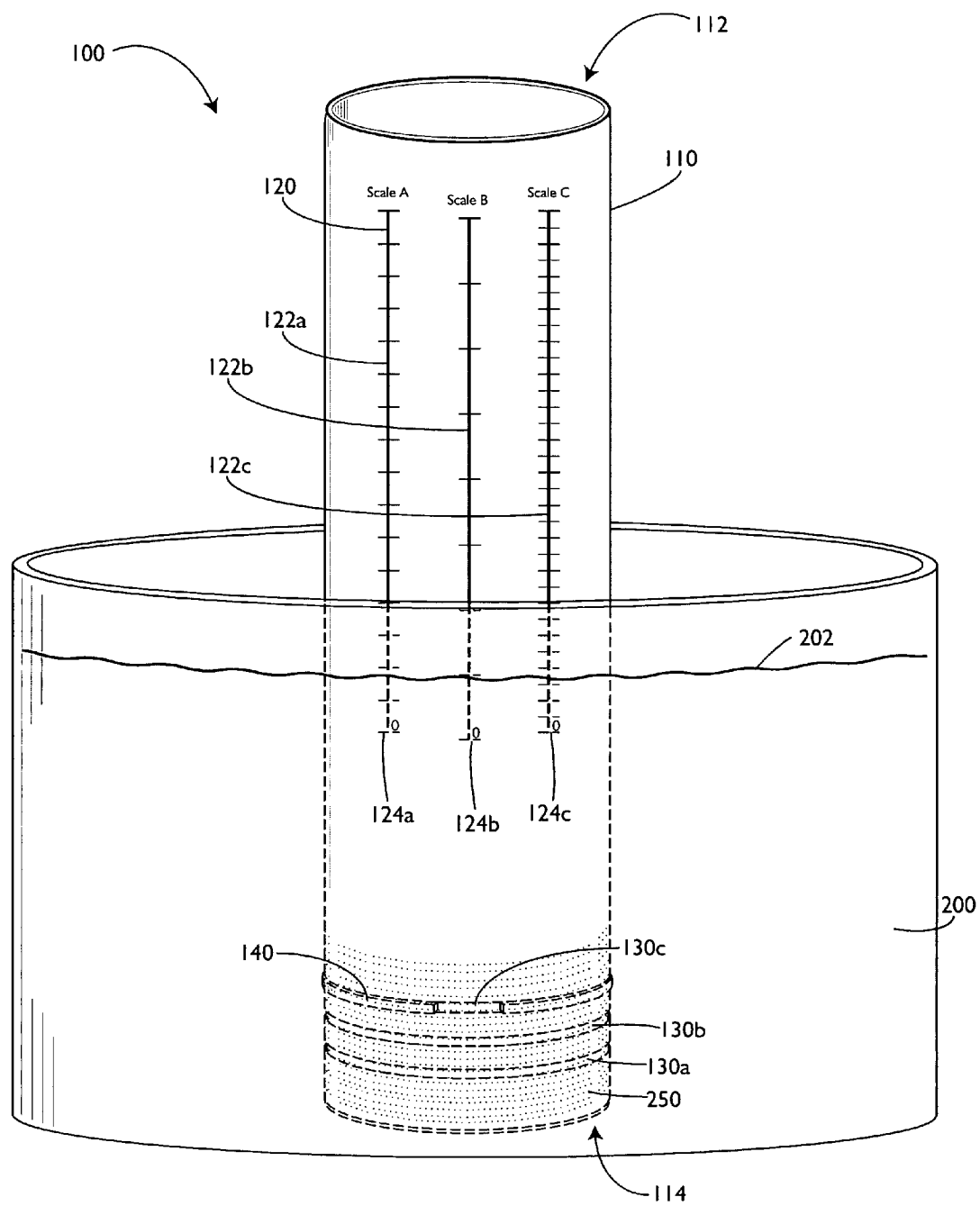
FIG. 2 is a perspective view of the hydraulic scale of FIG. 1, illustrated partially filled and floating in a liquid.

A hydraulic scale in accordance with the present disclosure is shown in FIGS. 1 and 2 and is referred to by reference numeral 100. Hydraulic scale 100 includes a tube 110 having indicia 120 disposed thereon. Tube 110 includes a top portion 112, which is substantially open and a bottom portion 114, which is substantially closed. Indicia 120 include at least one scale 122 having a zero line 124.

As illustrated in FIG. 1, tube 110 is configured to float substantially upright (i.e., top portion 112 being in an upward position) when hydraulic scale 100 is positioned in a liquid 200 (e.g., water). Further, hydraulic scale 100 is weighted such that zero line 124 of scale 122 substantially aligns with a surface 202 of water 200, when hydraulic scale 100 is substantially empty.

In an embodiment of the present disclosure, tube 110 includes at least one groove 130 disposed therein (three grooves 130a-130c are shown). Each groove 130 is configured to removably accept a weighted ring 140 (a single weighted ring 140 is shown at least partially within groove 130c). Thus, if hydraulic scale 100 is not optimally calibrated (i.e., surface 202 of water 200 is not substantially aligned with zero line 124 of scale 122 when hydraulic scale 100 is substantially empty), a user can insert (or remove) at least one weighted ring 140 into (or from) a respective groove 130 to help calibrate hydraulic scale 100.

To use hydraulic scale 100, a quantity of seed 250 (and/or feed) is collected and is placed into hydraulic scale 100 and hydraulic scale 100 is placed in water 200 in a substantially upright position. The weight of seed 250 causes hydraulic scale 100 to move lower with respect to surface 202 of water 200, such that surface 202 is aligned with a non-zero portion of scale 122. As can be appreciated, the more seed 250 placed within tube 110, the lower hydraulic scale 100 moves with respect to surface 202 of water 200, thus corresponding to a higher number on scale 122. Moreover, different types of crops generally require different types of fertilizers, insecticides and/or seeding densities.

Figure 3:
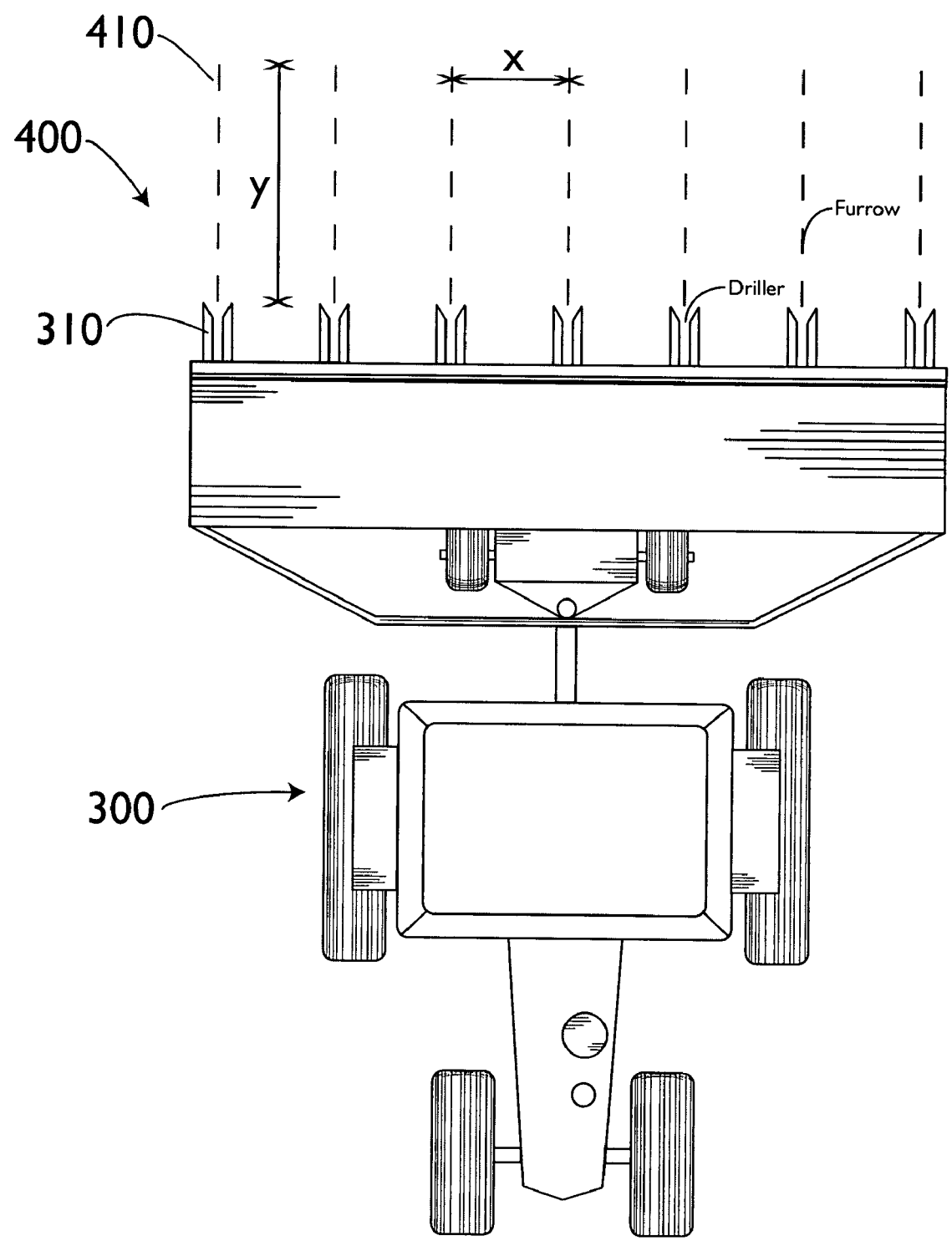
FIG. 3 is a top plan view of a tractor for use with the hydraulic scale of FIGS. 1 and 2.

With reference to FIG. 3, a contemplated use of hydraulic scale 100 is to determine the seeding (or sowing) density of a piece of equipment, such as a planter, seed drill, etc. (hereinafter referred to as planter 300). Generally, planter 300 includes drillers 310, which place seeds 250 in soil 400, and specifically in furrows 410 in soil 400. Drillers 310 of planter 300 are typically spaced substantially equidistantly from an adjacent driller. The distance between drillers 310 is referred to as letter x in FIG. 3. Distance x is typically adjustable and may be optimally set based on the type of seed 250 being planted.

To determine the seeding density of a particular planter 300, the area covered by each driller 310 of planter 300 is first calculated. The area covered by each driller 310 is calculated by multiplying the distance x between drillers 310 by the distance traveled by planter 300. The distance traveled by planter 300 is referred to as letter y in FIG. 3. For example, if there is 1.7 feet (0.525 meters) between drillers 310 (x), and planter 300 travels 164 feet (50 meters) (y), the area covered by each driller 310 is:

x*y, or 1.7 feet*164 feet=279 ft$^2$ (or 0.00640 acres).

Next, the relation between the quantity of seeds 250 distributed over this area and the weight of such seeds 250 is required. Thus, in accordance with an embodiment of the present disclosure, the seeds 250 distributed by a driller 310 of planter 300 are collected during a sample-obtaining run. To obtain these seeds 250, a user may remove a hose that connects a seed dosificator with a furrow opener and place a collecting structure (e.g., a bag) at an end of the hose to collect the seeds 250 placed by planter 300 along a distance y (e.g., 164 feet).

The seed 250 collected by the above method is then placed in hydraulic scale 100 and hydraulic scale 100 is placed in water 200. The user then reads where surface 202 of water 200 intersects scale 122 (a non-zero line portion). This reading is the seeding density of the planter 300 (or of each driller 310). It is envisioned that hydraulic scale 100 includes several scales 122 thereon. According to a disclosed embodiment, each of several scales 122 relates to a different amount of area covered by each driller 310 of planter 300. For instance, a first scale 122*a* may include a distance x of 1.7 feet and a distance y of 164 feet (and/or an area of 0.00640 acres), a second scale 122*b* may include a distance x of 0.57 feet and a distance y of 164 feet (and/or an area of 0.00216 acres), etc. In an embodiment where hydraulic scale 100 includes more than one scale 122, the user reads surface 202 of water 200 where it intersects the appropriate scale 122.

Once the seeding density of planter 300 is known, the user can determine if planter 300 has the desired/required seeding density for a given task.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended hereto.

What is claimed:

1. A hydraulic scale for planter calibration, comprising:
   a tube having a substantially closed bottom and a substantially open top;
   indicia disposed on the tube, the indicia including at least one scale having a zero line;
   a plurality of grooves disposed in the tube; and
   a plurality of weighted rings, wherein each of the weighted rings is removably insertable into one of the plurality of grooves,
   wherein the tube is configured to float substantially upright when positioned in a liquid such tat the zero line is substantially aligned with a surface of the liquid when the tube is substantially empty, and wherein a non-zero line portion of the scale is configured to align with the surface of the liquid when at least one of seeds and feed are placed within the tube.

2. The hydraulic scale of claim 1, wherein the indicia includes a plurality of scales and wherein each scale includes a zero line.

3. The hydraulic scale of claim 2, wherein each of the zero lines are substantially aligned with one another.

4. The hydraulic scale of claim 1, wherein the at least one scale corresponds to an area that was seeded by a planter.

5. The hydraulic scale of claim 1, wherein an intersection point between the surface of the liquid and the at least one scale indicates the seeding density of a planter.

6. The hydraulic scale of claim 5, wherein the seeding density of a planter is based on the distance traveled by a planter during a sample-obtaining run and the space between driller of the planter.

7. The hydraulic scale of claim 1, wherein the at least one scale displays the distance traveled by a planter during a sample-obtaining run.

8. The hydraulic scale of claim 1, wherein the at least one scale displays the distance between adjacent drillers of a planter.

9. A method for determining seeding density of a planter, comprising:
   providing a hydraulic scale including a tube having indicia thereon, a plurality of grooves disposed in the tube and a plurality of weighted rings, wherein each of the weighted rings is removably insertable into one of the plurality of grooves, and wherein the tube is configured to float substantially upright when positioned in a liquid, such that a zero line is substantially aligned with a surface of the liquid when the tube is substantially empty;
   collecting seeds placed by a planter as the planter travels a distance;
   placing the seeds within the hydraulic scale;
   placing the hydraulic scale within a liquid; and
   observing where the surface of the liquid intersects the indicia on the tube.

10. The method of claim 9, wherein the indicia includes a plurality of scales and wherein each scale includes a zero line.

11. The method of claim 10, wherein each of the zero lines are substantially aligned with one another.

12. The method of claim 9, wherein the at least one scale displays the area seeded by a planter.

13. The method of claim 9, wherein an intersection point between the surface of the liquid and the at least one scale indicates the seeding density of a planter.

14. The method of claim 13, wherein the seeding density of a planter is based on the distance traveled by a planter during a sample-obtaining run and the space between driller of the planter.

15. The method of claim 9, wherein the at least one scale displays the distance traveled by a planter during a sample-obtaining run.

16. The method of claim 9, wherein the at least one scale displays the distance between adjacent drillers of a planter.

* * * * *